Patented Oct. 11, 1938

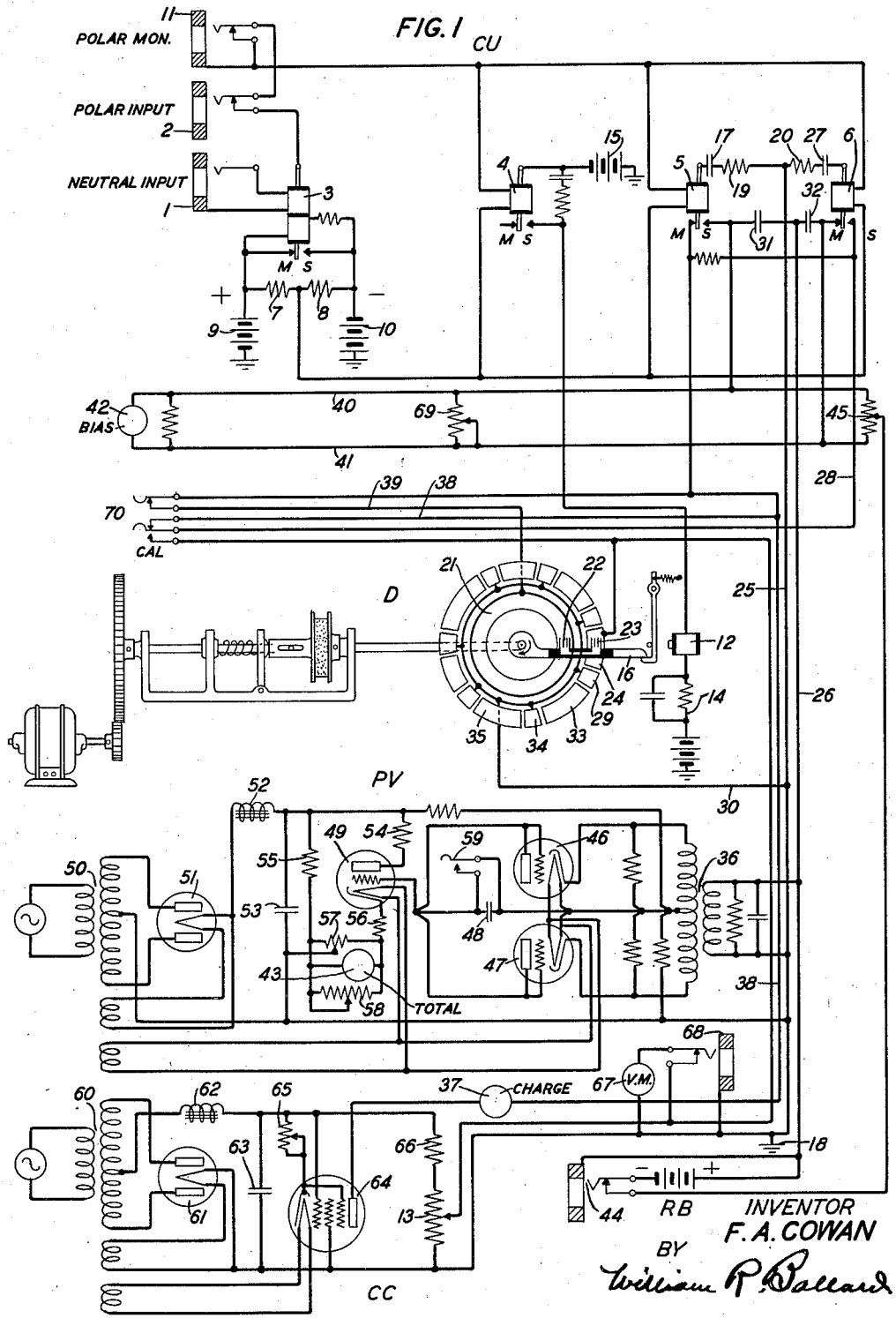

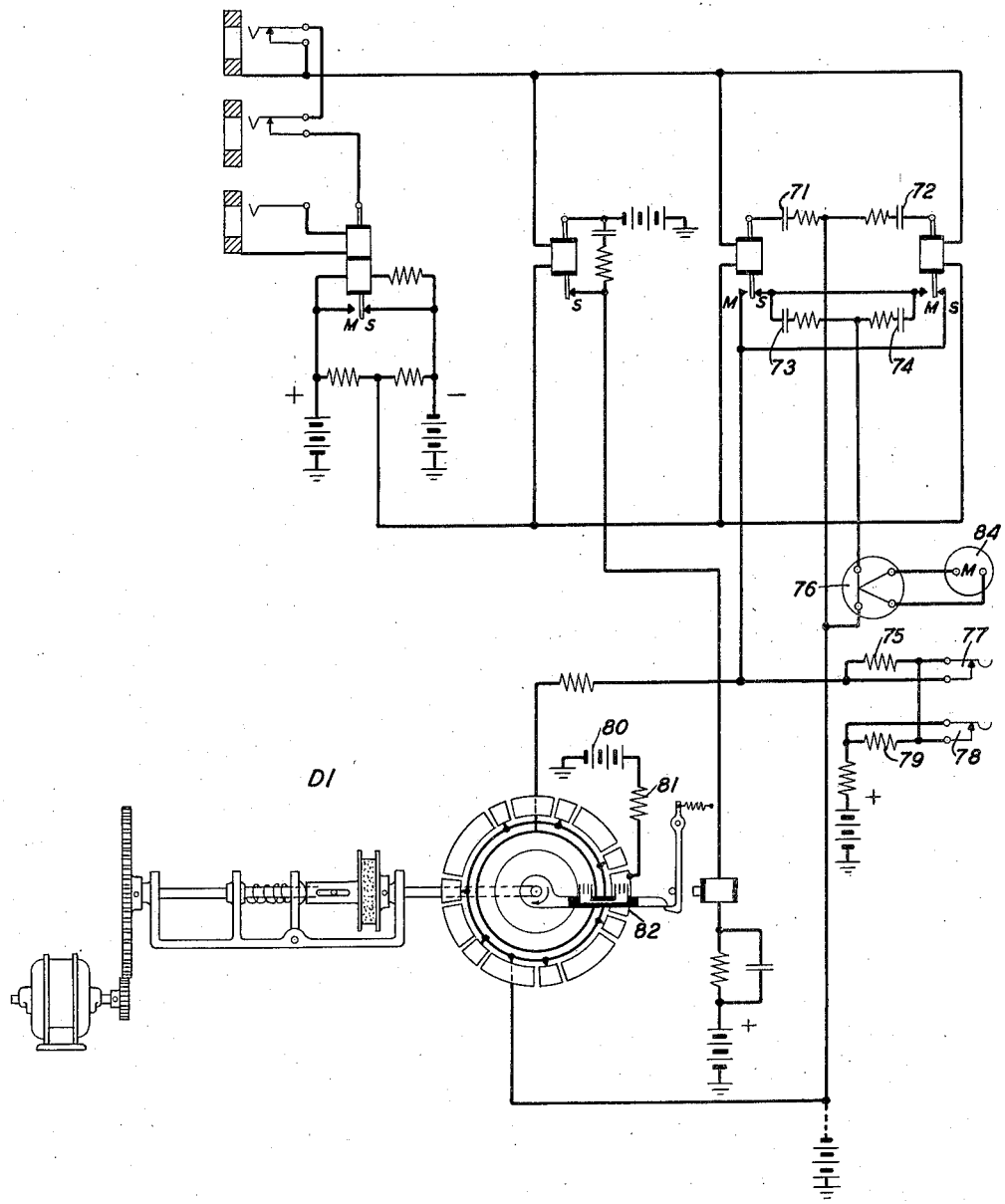

2,132,678

UNITED STATES PATENT OFFICE 2,132,678

SIGNAL DISTORTION MEASURING DEVICE

Frank A. Cowan, New York, N. Y., assignor to American Telephone and Telegraph Company, a corporation of New York Application July 2, 1935, Serial No. 29,569

14 Claims. (Cl. 178—69)

This invention relates to telegraph apparatus and more particularly to apparatus for measuring signal distortion in telegraph systems.

One of its objects is to obtain by means of meters quantitative indications of peak total distortion, peak fortuitous and characteristic distortion, average bias, the root mean square of the total distortion and the root mean square of the fortuitous and characteristic distortion in teletypewriter signals.

Among the features of the present invention are:

1. The use of a condenser charging and discharging circuit for translating time of occurrence relative to a standard into voltage and power magnitudes.

2. The use of a rotating distributor in combination with a condenser charging and discharging circuit to establish a standard of comparison.

3. The use of a rectifying peak voltmeter to measure the peak voltage difference occurring in a comparison circuit as a result of telegraph signal distortion.

4. The use of an integrating power meter to measure the root mean square value of power in a comparison circuit resulting from telegraph signal distortion.

5. The distortion in mark-to-space and space-to-mark transitions is measured over paths independent of each other so as to permit the determination of telegraph signal distortion independent of bias.

6. The combination of the mark-to-space and space-to-mark transition measurement in such a manner as to indicate on a meter telegraph signaling bias independently of other distortion.

7. The measurement of either the peak or root mean square value of telegraph signal distortion including bias, fortuitous, and characteristic distortion. The similar measurement of characteristic and fortuitous distortion and the measurement of fortuitous distortion alone.

8. The use of a resistance in a condenser charging circuit to calibrate the distortion measuring device.

9. The use of a vacuum tube voltmeter employing negative feed-back and a bridge circuit to secure the proper operating range and substantial freedom from variations in tube characteristics in so far as the calibration of the voltmeter is concerned.

10. The use of a constant current supply employing a pentode type vacuum tube and negative feed-back by means of which the charging circuit over the operating range is maintained substantially independent of voltage on the condenser.

11. The use of storing condensers to provide a reference voltage when measurements of the total range of distortion are desired.

12. The use of a battery to provide a fixed reference voltage when measurements of maximum departure of signals from the undistorted condition is desired.

13. The use when start-stop signals are being measured, of a means for controlling the voltage of a charge acquired by a measuring condenser during the stop interval.

According to the present invention, there is provided a telegraph transmission set which is capable of measuring on teletypewriter signals peak total distortion, peak fortuitous and characteristic distortion, average bias, the root mean square of the total distortion and the root mean square of the fortuitous and characteristic distortion. All measurements are quantitative and are read directly from meters. One embodiment of the invention disclosed herein is arranged to measure free running teletypewriter signals on a synchronous basis such as are used in multiplex telegraph systems and in certain start-stop systems, while another embodiment is arranged to measure miscellaneous signals on a non-synchronous basis which is equivalent to the usual start-stop printer operation. The measuring principle employed in both embodiments depends on the comparison of the voltage of a charge on a condenser at certain times with the average voltage of the charges. The circuit is arranged so that the charge on the condenser is proportional to the length of time which elapses between certain events. The times at which the charge on the measuring condensers start are determined by means of a rotary distributor. The times at which the voltages acquired by these condensers are compared with the average or reference voltage are determined by the signals being measured.

Before describing the operation of a system embodying the invention it is desirable to discuss the significance of the various forms of distortion hereinbefore mentioned.

The distortion known as "bias" refers either to the regular lengthening of the marking elements, which is known as "positive" bias, or to the regular shortening of these elements known as "negative" bias. It may be caused by bias in the sending or receiving relays, unequal battery voltages, or any other cause which produces an unbalance of constant value in the circuit.

"Characteristic" distortion is an irregular distortion dependent upon the combination of marking and spacing elements preceding the element being considered.

It is a regular distortion for any given combination of elements and is dependent upon the type of the system and the transmission line. The change in the length of the signal elements due to characteristic distortion may occur at either end of the elements. Generally it occurs at one end of some elements and at the opposite end of others.

"Fortuitous" distortion is an irregular distortion caused by external disturbances or by the faulty operation of some apparatus in the circuit. Although fortuitous distortion is independent of the signal combination, it is modified by the circuit between its point of introduction and the receiving device.

A more complete understanding of the invention will be had by referring to the accompanying drawings in which:

Figure 1 shows an arrangement according to the invention whereby the average bias and peak total distortion on a teletypewriter controlled telegraph line may be measured by plugging a transmission circuit not shown, into either jack 1 or 2.

Fig. 2 shows another arrangement whereby the root mean square of the total distortion on a teletypewriter telegraph line may be measured.

Referring to Fig. 1, jack 1 is for lines operating on a neutral signal basis and jack 2 for lines operating on a polar signal basis. Fig. 1 illustrates the following component parts:

1. A comparison unit CU comprising polar relays 3, 4, 5 and 6 with condensers 17, 27, 31 and 32.

2. A start-stop distributor D which operates in unison with the sending distributor at the distant end of the line.

3. A rectifying peak voltmeter PV to indicate the peak voltage corresponding to the peak of the total distortion.

4. A constant current supply circuit CC to furnish a constant current for charging the unit condenser hereinbefore mentioned.

Fig. 2 is provided with a comparison unit and distributor similar to that of Fig. 1. The root mean square of the total distortion is measured on a meter 84 which is connected to a thermocouple 76.

The comparison unit

Relay 3 is arranged to receive signals from a neutral circuit and to retransmit them to relays 4, 5 and 6 which are operated in parallel in a local circuit. Relay 3 may be connected by jack 1 to a neutral working circuit or relays 4, 5 and 6 by jack 11 to a polar working circuit. Relay 4 in its spacing or right-hand position, operates the start magnet 12 of the distributor D. Relays 5 and 6 are used to transfer condensers 17 and 27, hereinafter referred to as "unit condensers", from a charging circuit to a reference circuit through the primary winding of transformer 36 in the peak voltmeter PV.

When condensers 31 and 32, hereinafter referred to as "reference condensers", are used to provide a reference potential a dummy insulating plug is inserted in jack 44 to remove the reference battery RB from the circuit. At the beginning of a spacing element of a signal, relay 5 disconnects unit condenser 17 from the charging circuit and connects it to reference condenser 31 in series with the primary winding of the peak voltmeter transformer 36. Relay 6 controls unit condenser 27 and switches it to reference condenser 32 at the beginning of a marking element of a signal.

A voltage equal to the difference between the voltages on unit condensers 17 or 27 and the voltages on reference condensers 31 or 32 at the time they are connected together, is impressed across the primary winding of peak voltmeter transformer 36.

When the reference battery RB is used to provide a fixed reference potential no plug is inserted in the reference battery jack 44. The circuit functions as described hereinbefore except that relays 5 and 6 disconnect unit condensers 17 and 27, respectively, from the charging circuit and connect them to the reference battery through resistance 45. A voltage equal to the difference between the voltages on the unit condensers 17 or 27 and that of the reference battery at the time either condenser and the battery are connected together is impressed across the primary of the peak voltmeter transformer 36.

The start-stop distributor D of Fig. 1 and Fig. 2 is provided to establish reference points for commencing the charge on the unit condensers of the comparison unit. These reference points are oriented in respect to the incoming teletypewriter signals so that the charge on the unit condensers always begins at the same point in relation to succeeding transitions of space-to-mark or mark-to-space, when the signals are not distorted. When there is signal distortion this relation varies in accordance with the distortion.

The rectifying peak voltmeter PV is provided to measure the difference between the reference voltage and the voltage on the unit condensers at the time of a transition from mark-to-space or space-to-mark. Meter 43 is arranged to give a steady reading of the maximum distortion occurring during the period that a measurement is being made. A voltage impressed on transformer 36 by the comparison unit is rectified by the tubes 46 and 47 to produce a negative voltage on the grid of tube 49. Condenser 48 is provided to store this negative charge and maintain the grid of tube 49 at the maximum negative potential received. The power supply is furnished by power transformer 50, rectifier tube 51, and the filter consisting of the retardation coil 52 and condenser 53. A Wheatstone bridge circuit in which the cathode-plate circuit of tube 49 and resistances 54 and 56 form one arm is provided for making the measurements. The corresponding arm consists of resistance 55. The other two arms are represented by the two adjacent resistance sections of zero adjusting potentiometer 57. The total distortion meter 43 and the amplitude adjusting potentiometer 58 are connected across this bridge. The amplitude adjusting potentiometer is used for calibrating the total distortion meter 43 in per cent. distortion.

When condenser 48 is discharged by operating key 59 the zero adjusting potentiometer 57 is adjusted to produce a zero reading on the total distortion meter 43. Kicks through the input transformer 36 causing a negative voltage to be impressed on the grid of tube 49 and stored in condenser 48, increases the plate resistance of tube 49 thus unbalancing the bridge. The reading on total distortion meter 43 will be approximately proportional to the unbalance in the bridge circuit, which in turn is caused by the distortion. Each time before taking a measurement condenser 48 is short-circuited by actuating key 59 so as to obtain a zero reading on the total distortion meter 43.

*Constant current supply circuit CC.*—Direct current is supplied from power transformer 60 and rectifier tube 61, through the filter consisting of retardation coil 62 and condenser 63, to tube 64. The grid of tube 64 is connected to the negative side of the direct current supply and the screen of the tube is connected to the positive side. The grid potential is controlled by the constant current potentiometer 65 in series with the cathode of tube 64. A charging current meter 37 is provided in the plate circuit of this tube. With this arrangement the plate circuit current is practically constant over a wide range of plate voltage for a given setting of the potentiometer 65. This current is indicated on the charging current meter 37. The stop compensating potentiometer 13 in series with resistance 66 provides a potentiometer across the direct current supply to impress the correct voltage on condenser 17 of the comparison unit CU when the brush arm of the distributor D is at rest.

*Calibration.*—To illustrate how the apparatus of the invention should be calibrated assume that a neutral telegraph line operating on approximately 60 milliamperes is plugged into the jack 1 with no signals being received. First the constant current potentiometer 65 is adjusted to give a reading of approximately 30 milliamperes on charging current meter 37. With the reset key 59 held operated adjust the zero adjusting potentiometer 57 to give a zero reading on the total distortion meter 43. With a source of undistorted signals patched to the set, the stop compensating potentiometer 13 should be adjusted until the bias meter 42 reads zero. To calibrate the set for use with reference condensers a dummy insulating plug should be inserted in jack 44 to remove the reference battery RB from the circuit. The transmission of signals should then be stopped and the voltage applied to unit condenser 17 through the stop segment 24 of distributor D from the stop compensating potentiometer 13, should be read on the stop compensating voltmeter 67. If a reference battery is to be used the aforesaid dummy plug should be removed from the jack 44 and the stop compensating meter 67 should be connected to battery RB by connecting jack 68 to jack 44 with a patching cord in order to read the reference battery voltage. By using a flexible battery lead the proper number of cells should be included to provide a battery voltage equal to that obtained from the stop compensating potentiometer 13. The patching cord connecting jacks 44 and 68 should then be removed. This cord should be in place only while the reference battery voltage is being read and adjusted. With undistorted signals again being transmitted the calibrate key 70 should be held operated while reset key 59 is momentarily operated and released and the amplitude adjusting potentiometer 58 is adjusted to give a reading of approximately 20% on the total distortion meter 43. It has been found in practice that meter 43 may conveniently have a total scale deflection of approximately 1 milliampere. The scale of this meter should be marked to indicate per cent. distortion. The calibrate key 70 should now be released and reset key 59 operated. The calibrate key 70 should now be operated again and the bias potentiometer 69 should be adjusted so that the reading on the bias meter 42 indicates 20 per cent. It has been found in practice that a microameter with a range of 100—0—100 microamperes and with a scale of 25—0—25 indicating percentage is suitable for this purpose.

After the apparatus has been calibrated as described in the preceding paragraph, the measuring set is ready for use in measuring telegraph transmission on neutral or polar working circuits.

The operation will now be described for measuring the distortion of signals on a neutral operating telegraph line using reference condensers, the reference battery RB being disconnected by the insertion of a dummy insulating plug into jack 44. Assume that the line to be tested is plugged into jack 1 and that the set is calibrated for use with reference condensers as described hereinbefore. During the stop interval, which is a marking interval, polarized relay 3 is operated to its marking contacts by reason of the combined effect of the currents through its upper and lower windings. Relay 3 in operating holds open the contacts of relay 4 and holds polarized relays 5 and 6 operated on their marking contacts. The current paths through the windings of relays 4, 5 and 6 may be traced from positive battery 9 through marking contacts of relay 3, break contacts of jacks 2 and 11, windings of relays 4, 5 and 6 all in multiple and resistance 8 to negative battery 10. While the contacts of relay 4 are open, the circuit through the winding of starting magnet 12 of start-stop distributor D is open. Let it be assumed now that a character is transmitted over the telegraph line. The first impulse over the line is the start impulse which is a spacing impulse which opens the circuit through the upper winding of relay 3, and causes relay 3 to operate on the current through its lower winding and close its spacing contacts. This causes a reversal of the direction of current flow through the windings of relays 4, 5 and 6, since relay 3 in operating to its spacing contacts transfers the upper winding terminals of relays 4, 5 and 6 from positive battery 9 to negative battery 10. Relays 4, 5 and 6 now operate to their spacing contacts. Relay 4 in operating closes a circuit from positive battery 14 to negative battery 15 through the winding of starting magnet 12 which attracts its armature, thereby releasing the brush arm 16 and allowing the brushes 22 and 23 to make one revolution over the face of the distributor D.

Before relay 5 operated to its spacing contacts unit condenser 17 is charged through a circuit that may be traced from ground 18, over conductor 25, through resistance 19, condenser 17, marking contacts of relay 5, upper break contacts of calibrating key 70, inner ring 21 of distributor D, inner and outer brushes 22 and 23 and segment 24 to upper contact of potentiometer 13. When relay 5 operated to its spacing contacts the charge on unit condenser 17 was mixed with the charge on reference condenser 31, over conductors 25 and 26, through the winding of peak voltmeter transformer 36. When relay 6 was operated to its spacing contacts in response to the start impulse unit condenser 27 was connected, through spacing contacts of relay 6, over conductor 28, through lower and upper break contacts of key 70, over conductor 39, ring 21, brushes 22 and 23, segment 24, through potentiometer 13, ground 18 and conductor 25. Unit condenser 27 accordingly is charged through this circuit. When brush 23 reaches segment 29, unit condenser 27 is discharged, since segment 29 is connected over conductors 30 and 25 to ground 18.

As soon as brush 23 leaves segment 29, however, unit condenser 27 begins to charge again until there is a transition from spacing to marking. When this occurs relays 3, 4, 5 and 6 are again operated to their marking contacts. This causes the charge accumulated on unit condenser 27 to be mixed with the charge on reference condenser 32, through the winding of peak voltmeter transformer 36 and at the same time unit condenser 17 begins to charge from the constant current supply circuit through meter 37, over conductor 38, marking contacts of relay 5, unit condenser 17, resistance 19 to ground 18 over conductor 25. When brush 23 reaches segment 34, the accumulated charge on unit condenser 17 is dissipated through upper break contacts of key 70, conductor 39, ring 21, brushes 22 and 23, segment 34 and conductors 30 and 25 to ground 18. When brush 23 leaves segment 34 unit condenser 17 again begins to charge over the circuit path hereinbefore traced. This charging of unit condenser 17 continues until the next transition—mark-to-space—when relays 3, 4, 5 and 6 operate to their spacing contacts. When this occurs the charge on unit condenser 17 is mixed with the charge on reference condenser 31. The operation just described is continued until the distributor arm comes to rest with brushes 22 and 23 connecting ring 21 to stop segment 23, relays 3, 4, 5 and 6 operating to their marking contacts. When another character is received the brush arm 16 is released again, and the action just described is repeated.

The operation of the invention will now be discussed for the condition, first, when the incoming telegraphic signals are undistorted, secondly, for the condition where the signals are distorted.

When the incoming signals are undistorted reference condensers 31 and 32, after a few operations of relays 5 and 6, receive a maximum steady charge. Under this condition there will be no flow of current over conductors 40 and 41 through bias meter 42. This follows from the fact that, since there is no distortion of the incoming signals the time available for the charge of unit condenser 17, which charge is transferred to reference condenser 31, on transitions from mark-to-space, is the same as the time available for the charge of unit condenser 27, which charge is transferred to reference condenser 32 on transitions from space-to-mark. The charges accumulated on reference condensers 31 and 32 are accordingly equal, and there will be no equalizing current flow through bias meter 42. Under this condition of undistorted signals total distortion meter 43 also will indicate zero current, since the voltages existing on unit condensers 17 and 27 are each equal to the potential on the reference condensers 31 and 32.

When the incoming signals are distorted there will be a flow of current through both total distortion meter 43 and bias meter 42 as will be seen from the hereinafter-given description.

When the incoming signals are biased they may be biased either to marking or to spacing. If biased to marking the space-to-mark transitions will be advanced by the amount of the bias while the mark-to-space transitions will not be affected. Therefore, on the average, the voltage on unit condenser 27 at the time of transitions from space-to-mark will be less than the normal voltage on reference condensers 32 and 31 by an amount corresponding to the bias. The voltage of unit condenser 17 at the time of transitions from mark-to-space will be equal to the normal voltage on reference condensers 32 and 31. The number of transitions from mark-to-space is equal to the number of transitions from space-to-mark so that the normal voltage on reference condensers 31 and 32 will be equal to the mean value of the charges received by the unit condensers 17 and 27. The process of mixing the charges will cause the average voltage on reference condensers 31 and 32 (which are connected in parallel through bias meter 42) to be equal to the average of the voltages attained by unit condensers 17 and 27. The charges transferred between reference condensers 31 and 32 and unit condensers 17 and 27 which cause a flow of current in total distortion meter 43, represent one-half the change in voltage due to the bias. Due to the parallel connection of reference condensers 31 and 32, the current flowing through bias meter 42 is one-half that flowing through the primary winding of peak voltmeter transformer 36 for each transition, the direction of the current flow through bias meter 42 being the same for space-to-mark and mark-to-space transitions. When the incoming signals are biased to spacing, the space-to-mark transitions will be retarded by the amount of the bias, while the mark-to-space transitions will not be affected. The effect of this will be to cause unit condenser 17 to assume an average charge at the time of transitions from space-to-mark which will be less than the normal voltage on reference condensers 32 and 31 by an amount corresponding to the bias. Under this condition the voltage of unit condenser 27 at the time of transitions from mark-to-space will be equal to the normal voltage on reference condensers 32 and 31 and bias meter 42 will now indicate a current flow in a direction opposite to that for positive bias. By calibration with biased signals, total distortion meter 43 is arranged to indicate directly in per cent. distortion. Bias meter 42 is also arranged to indicate the distortion in percentage.

If fortuitous distortion alone is present and if its distribution is symmetrical with respect to the average, the average voltage on reference condensers 31 and 32 will be equal to the voltage on these condensers for undistorted signals. The charge transferred at each transition is then proportional to the fortuitous distortion but due to the calibration of total distortion meter 43, as hereinbefore mentioned, the indicated distortion is twice the amount of the fortuitous distortion. This is also the indication shown for characteristic distortion, if its effect is similar to that of fortuitous distortion.

The indication shown by bias meter 42 depends upon the number of transitions per second in the received signals. Assuming miscellaneous signals, even though bias is the only distortion present, the indication will be unsteady. This is due to a variation in the average current flowing due to change in the number of transitions per second as different printer characters are received. If characteristic distortion alone is present, there will be a wavering of the reference voltage depending upon the character of the signals which will cause an unsteady indication on bias meter 42.

The operation of the measuring set will now be discussed for use with reference battery RB. Before using, the set should be given the reference battery calibration described hereinbefore.

Under this condition, there will be no plug in jack 68. The voltage of the reference battery is adjusted to be the same as that applied to the stop segment 24 of the distributor D by the stop compensating potentiometer 13. There is therefore no change in potential across the bias meter 42 and consequently no current flow through the meter when relay 5 operates to spacing. Let it be assumed that biased signals with no other distortion present cause unit condenser 27 to be charged to a higher potential than condenser 17. When relay 6 operates to marking there will be a flow of current from the positive side of unit condenser 27 through the primary winding on peak voltmeter transformer 36, through reference battery RB, contacts of jack 44, through one-half of resistance 45, marking contacts of relay 6 to the negative side of unit condenser 27. Current will also flow from the positive side of unit condenser 27, through the winding of the peak voltmeter transformer 36, through reference battery RB, contacts of jack 44, the other half of resistance 45, through bias meter 42 and marking contacts of relay 6 to the negative terminal of unit condenser 27. The current flow through the primary winding of transformer 36 will cause a corresponding reading on total distortion meter 43, which has been calibrated for reference battery use as hereinbefore stated. This will occur each time relay 6 operates to marking and the current through bias meter 42 will be twice as great as when reference condensers are used since it is produced by the difference of potential between unit condensers 17 and 27 while in the case of reference condensers it is produced by the difference of potential between unit condensers 17 and 27 and the average of the charges on unit condensers 17 and 27. The net result is the same, however, as the current flow occurs twice as often in the case where reference condensers are used. The operation is similar if the bias is such as to charge condenser 27 to a lower potential than that of condenser 17.

When the measuring set is used in a polar circuit, the polar line is plugged into jack 2. The windings of relays 4, 5 and 6, all in multiple are then controlled by positive current applied at the distant end, which cooperates with the positive and negative current from batteries 9 and 10, respectively. Otherwise, the invention operates as hereinbefore described for a neutral line.

The operation of the measuring set will now be discussed for the arrangement in which measurements are made in terms of the root of the mean square of the distortion. The general arrangement of Fig. 2 is similar to that of Fig. 1. A start-stop distributor D1 with a comparison unit consisting of two unit and two reference condensers is used. Battery 80 is shown connected through resistance 81 to the stop segment 82 of distributor D1. A potentiometer arrangement similar to potentiometer 13 of Fig. 1 could, however, be used. When the charges on unit condensers 71 and 72 are mixed with the charges on reference condensers 73 and 74 the equalizing current flows through a heater resistance of thermocouple 76. The couple proper is straddled over the heater resistance, or welded thereto. When the current to be measured goes through the heater resistance the thermal energy produced thereby in the couple proper is changed to continuous current to actuate meter 84. The current flow through meter 84 is accordingly proportional to the power dissipated in the heater resistance of thermocouple 76, that is, proportional to the mean square of the current flow in the heater resistance.

The scale of meter 84 is calibrated to indicate the root of the mean square value of the current and accordingly the root of the mean square value of the distortion. In order to extend the range of meter 84, multiplying resistances 75 and 79 controlled by keys 77 and 78, respectively, may be connected in the condenser charging circuit, as shown.

The arrangement before described is for measuring the root mean square of the total distortion. An arrangement similar to that of Fig. 1 whereby a thermocouple and associated meter may be connected to equalize the charges on reference condensers 71 and 72, may be used to obtain indications of the root mean square of the average distortion.

The drawings and the description hereinbefore given are based on the use of a start-stop distributor to control the charging of the unit condensers. It is to be understood, however, that a similar arrangement using a distributor operating synchronously with the teletypewriter sending distributor may be used to measure distortion on a synchronously operating system. With the synchronous arrangement, means are provided for starting the charging distributor in synchronism with the sending distributor and for maintaining the start latch in the released position after the initial starting. With the synchronous arrangement it is not necessary to provide a potential on the stop segment of the distributor, since the charging of the unit condensers through this segment is identical with the charging of these condensers through each of the other segments, once the distributor has been started.

What is claimed is:

1. In a signaling system, a source of incoming signal impulses of varying character, and a device for measuring distortion in said signal impulses comprising a rotary distributor, a plurality of relays responsive to signal impulses from said source, one of said relays arranged to start said distributor, a group of storing elements and a source of potential for charging said elements, said source of potential being arranged under the control of said distributor and said plurality of relays for alternately charging and alternately discharging the storing elements of said group, a second group of storing elements normally arranged to store individual voltage charges corresponding to the average voltage of the charges stored in storing elements of the first-mentioned group, circuits established by the signal impulses from said source for respectively interconnecting the storing elements of one group to the storing elements of the other group whereby the charges stored on the interconnected storing elements are compared with each other, characterized in this that by connecting a resistance element in said circuits and a measuring device across said resistance, any difference in potential of the compared voltage of charges on said interconnected storing elements is indicated as a quantitative value of the distortion present in the signal impulses received from said source.

2. In a signaling system, a source of signals of varying character, a device for measuring distortion comprising signal responsive means, a rotatable member responsive to said means for providing time intervals of definite duration for each received signal, an energy storing element, a source of energy, a normally closed circuit for storing energy in said element, sections on said member for alternately releasing and storing the energy in said element, a second energy storing element adapted to receive the energy stored in the first-mentioned storing element every time the signal responsive means operates, the successive operations of said signal responsive means serving to accumulate and maintain on said second storing element an amount of energy corresponding to the average of the individual amounts stored in the first-mentioned storing element, and recording means connected to said storing elements for indicating any difference in the amounts of energy stored in said storing elements when said signal responsive means operates.

3. In combination, a source of incoming current impulses of start-stop permutation code, and a distortion measuring device for translating time of occurrence relative to a standard into voltage magnitude comprising a circuit and a source of potential therefor, a condenser in said circuit arranged to store a charge in response to certain of the current impulses, a start-stop rotatable element for providing standard or normal time intervals, means responsive to said rotatable element to store a charge on said condenser at the beginning of alternate normal intervals, means dependent on the successive charges stored on said condenser for establishing a standard, or steady, value of voltage, means responsive to said source of incoming impulses for comparing the voltage of the charge on said condenser with the said voltage of standard value and means for measuring and indicating any differences between the voltage on said condenser and the said voltage of standard value.

4. In a signaling system, according to claim 3, wherein the means for measuring and indicating any difference between the voltage stored on said condenser and the said voltage of standard, or steady, value produced by the second-mentioned means is a rectifying peak voltmeter circuit comprising a transformer for receiving voltages due to any variation in time of occurrence of received signal impulses as compared with the beginning of the normal or standard length of impulses, a rectifier circuit responsive to the output of said transformer, a condenser responsive to said rectifier circuit, a vacuum tube, the input of which is connected to said condenser, a Wheatstone bridge arrangement so connected that the plate circuit of the said vacuum tube is one arm of the bridge, and a meter connected across said Wheatstone bridge arrangement to indicate unbalance of the bridge occasioned by the peak voltage differences due to variations in time of occurrence of the received signal impulses as compared with the normal or standard lengths of impulses.

5. In a signaling system, according to claim 3, whereby the means for measuring the variation in voltage values of received signals from a standard, or steady, value is a device comprising a heater resistance arranged to receive the variations in voltage values, a pair of interconnected dissimilar metals in engagement with said heater resistance, and a meter for indicating the value of current flow received from said metals, which flow is proportional both to the power dissipated in said heater resistance and the root mean square of the current flow in said heating resistance.

6. In a telegraph system, a source of incoming space and mark signal pulses and a device for measuring distortion in said pulses comprising a plurality of circuits for measuring the distortion in mark-to-space and space-to-mark transition, respectively, a return path common to said plurality of circuits, a condenser in one of said circuits for storing momentary voltages due to mark-to-space transitions, a condenser in the other of said circuits for storing momentary voltages due to space-to-mark transitions, another condenser arranged to be connected in each of said circuits in response to the signal pulses from said source, and controlled by either of the first-mentioned condensers for accumulating a voltage charge of a value which is the average of several successive voltage charges on one of the first-mentioned condensers, a timing circuit controlled by the signal pulses from said source for establishing intervals of definite duration wherein each of the first-mentioned condensers is alternately charged and discharged in rapid succession when no transitions in the signal pulses from said source are occurring, indicating means associated with said plurality of circuits for indicating whenever the time of occurrence of any transition in the signal pulses from said source differs from the time of beginning of said definite interval, first, total, or peak, values including bias, fortuitous and characteristic distortion, secondly, bias distortion independently of fortuitous and characteristic distortion, thirdly, fortuitous and characteristic distortion independently of bias, and fourthly, fortuitous distortion alone.

7. In accordance with claim 6 wherein the indicating means comprises a heated element device for determining the quantitative value of the distortion present in the signal from said source.

8. In a signaling system, a source of incoming signals of varying character, and a device for measuring distortion in said signals comprising a rotary distributor, a plurality of relays responsive to signals from said source, one of said relays arranged to start said distributor, a group of storing elements, a source of potential and a circuit for charging said elements, said source of potential being arranged under the control of said distributor and certain of said plurality of relays for alternately charging and alternately discharging the storing elements of said group, a means responsive to repeated charging and discharging of each of said storing elements for producing standard or steady voltage, circuits established by the signals from said source for respectively connecting the storing elements of said group to the means for providing the said standard or steady voltage whereby the voltages stored on the said group of storing elements are compared with the said standard or steady voltage, characterized in this that by connecting a resistance element in said circuits and a measuring device across said resistance, any difference in potential of the compared voltages on said interconnected storing elements and means for providing a standard of normal voltage, is indicated as a quantitative value of distortion present in the signals received from said source.

9. In a signaling system, a source of incoming signal impulses arranged to be received in groups, a device for measuring distortion comprising a start-stop rotary distributor responsive to the first impulse of each group for providing intervals of time of a definite duration, a condenser, a circuit and a source of potential therefor arranged to cooperate with said timing device for alternately charging and discharging said condenser, a second condenser, relay means responsive to the impulses of said incoming signal impulse groups, one of said relay means when operated being effective to start said distributor, a circuit for said second condenser arranged to receive the charge of the first-mentioned condenser every time said relay means responds to said signal impulses, said second condenser being arranged to maintain after several successive operations of said relay means an average voltage of the successive charges on said first-mentioned condenser, and indicating means in said circuit of said second condenser for measuring any difference in voltage between the charge stored on the first-mentioned condenser and the voltage of the average charge stored on said second condenser every time said relay means operates.

10. In a signaling system, a source of incoming signals of varying character, and a device for measuring distortion in said signals comprising a distributor, a plurality of relays responsive to signals from said source, one of said relays arranged to start said distributor, a group of storing elements, a source of potential and a circuit for charging said elements, said source of potential being arranged under the control of said distributor and certain of said plurality of relays for alternately charging and alternately discharging the storing elements of said group, a means for producing standard or steady voltage, circuits established by the signals from said source for respectively connecting the storing elements of said group in series with the means for providing said standard or steady voltage whereby the voltages stored on the said group of storing elements are compared with the said standard or steady voltage, characterized in this that said source of potential for charging said elements comprises an electron discharge device the electrodes of which are so arranged as to produce a substantially constant charging current.

11. In a signaling system, a source of incoming signals of varying character, and a device for measuring distortion in said signals comprising a rotary distributor, a plurality of relays responsive to signals from said source, one of said relays arranged to start said distributor, a group of storing elements, a source of potential and a circuit for charging said elements, said source of potential being arranged under the control of said distributor and certain of said plurality of relays for alternately charging and alternately discharging the storing elements of said group, a means for producing standard or normal voltage, circuits established by the signals from said source for respectively interconnecting the storing elements of said group and the means for providing said standard or normal voltage whereby the voltages stored on the said group of storing elements are compared with the said standard or normal voltage, characterized in this that said circuits comprise a rectifying peak voltmeter employing a Wheatstone bridge arrangement wherein a vacuum tube having negative feed-back circuit is used for indicating any difference in potential of the compared voltages on said interconnected storing elements and said means for providing a standard or normal voltage.

12. In a signaling system, a source of incoming signals of varying character, and a device for measuring distortion in said signals comprising a rotary distributor, a plurality of relays responsive to signals from said source, one of said relays arranged to start said distributor, a group of storing elements, a source of potential and a circuit for charging said elements, said source of potential being arranged under the control of said distributor and certain of said plurality of relays for alternately charging and alternately discharging the storing elements of said group, a means for producing standard or normal voltage, circuits established by the signals from said source for respectively interconnecting the storing elements of said group to the means for providing said standard or normal voltage whereby the charges stored on the said group of storing elements are compared with the said standard or normal voltage, means for measuring any difference in potential of the compared voltages, characterized in this that said charging circuit comprises an impedance element for calibrating said device, said element being introduced in said charging circuit in such a manner as to produce effects equivalent to given amounts of signal distortion.

13. In a system for measuring bias distortion, a telegraph system, a source of pulses to be measured, devices capable of storing an electric charge, means for causing the storing in said devices during the receipt of each pulse from said source of a charge of a value depending upon the bias distortion of the pulse from said source, circuit means comprising instrumentalities respectively connectable in series with said devices when each of the pulses from said source is received, and measuring instrumentalities controlled by any difference in voltage between the resultant charge accumulated on any one of said instrumentalities and resulting from a plurality of successive charges on its associated one of said devices and a charge stored on its associated one of said devices every time a pulse is received from said source.

14. In combination, a source of incoming current impulses of opposite characters and a distortion measuring device for translating time of occurrence relative to a standard into voltage magnitude comprising a circuit and a source of potential therefor, condensers in said circuit respectively arranged to store charges in response to the current impulses of opposite characters, a timing element for providing standard or normal time intervals, means responsive to said timing element to store a charge on one or the other of said condensers at the beginning of each of the normal intervals, means corresponding in number to said condensers dependent on the successive charges stored on its corresponding condenser for establishing a standard, or steady, value of voltage, means responsive to said source of incoming current impulses for comparing the voltage of the charge of each of said condensers with the said voltage of standard value established on its corresponding first-mentioned means, means for measuring and indicating any difference between the voltage on either of said condensers and the said voltage of standard value on its corresponding first-mentioned means, said last-mentioned means being adapted to determine which of the current impulses of opposite characters incoming from said source wherein distortion is present.

FRANK A. COWAN.